Feb. 12, 1924.

J. H. GRAY 1,483,796

MELTING OR SMELTING LOW VOLATILE METALS

Filed Aug. 20, 1920    7 Sheets-Sheet 2

INVENTOR
James H. Gray
BY
ATTORNEY

Feb. 12, 1924.

J. H. GRAY 1,483,796

MELTING OR SMELTING LOW VOLATILE METALS

Filed Aug. 20, 1920

INVENTOR
James H. Gray
BY
ATTORNEY

Feb. 12, 1924.
J. H. GRAY
1,483,796
MELTING OR SMELTING LOW VOLATILE METALS
Filed Aug. 20, 1920
7 Sheets-Sheet 4

FIG.5.

INVENTOR
James H. Gray
BY
D. Anthony ...
ATTORNEY

Feb. 12, 1924.

J. H. GRAY

1,483,796

MELTING OR SMELTING LOW VOLATILE METALS

Filed Aug. 20, 1920        7 Sheets-Sheet 5

INVENTOR
James H. Gray
BY
ATTORNEY

Feb. 12, 1924.
J. H. GRAY
1,483,796
MELTING OR SMELTING LOW VOLATILE METALS
Filed Aug. 20, 1920
7 Sheets-Sheet 7

FIG. 8.

INVENTOR
James H. Gray
BY
ATTORNEY

Patented Feb. 12, 1924.

1,483,796

UNITED STATES PATENT OFFICE.

JAMES H. GRAY, OF NEW YORK, N. Y.

MELTING OR SMELTING LOW VOLATILE METALS.

Application filed August 20, 1920. Serial No. 404,727.

*To all whom it may concern:*

Be it known that I, JAMES H. GRAY, a citizen of the United States, residing in the city, county, and State of New York, have invented certain new and useful Improvements in Melting or Smelting Low Volatile Metals, of which the following is a specification.

In my Patent No. 1,340,951, May 25th, 1920, I have described a furnace designed particularly for smelting ores of low volatile metals or for melting such metals by the use of a centrally located electrical heating device from which the heat was radiated over the surrounding charge, the heating device being shown in the form of a resistor. The present invention relates to a furnace of the same general class, designed more particularly for the melting of low volatile metals, though adapted also for the smelting of ores and other uses. For the melting of low volatile metals, or alloys thereof, it will be observed also that a smaller furnace is generally sufficient than for the smelting of ores. Also it is desirable to have such a melting furnace tilt so as to pour off the molten charge, instead of being fixed and provided with a tap hole. For melting metals or alloys thereof the use of a granular resistor, which would flow at the angle at which the furnace is tilted, is also a certain disadvantage.

My present invention is an improvement in these respects and in other features hereinafter referred to in detail.

The accompanying drawings illustrate my improved process and certain apparatus for carrying it out.

Figure 1:
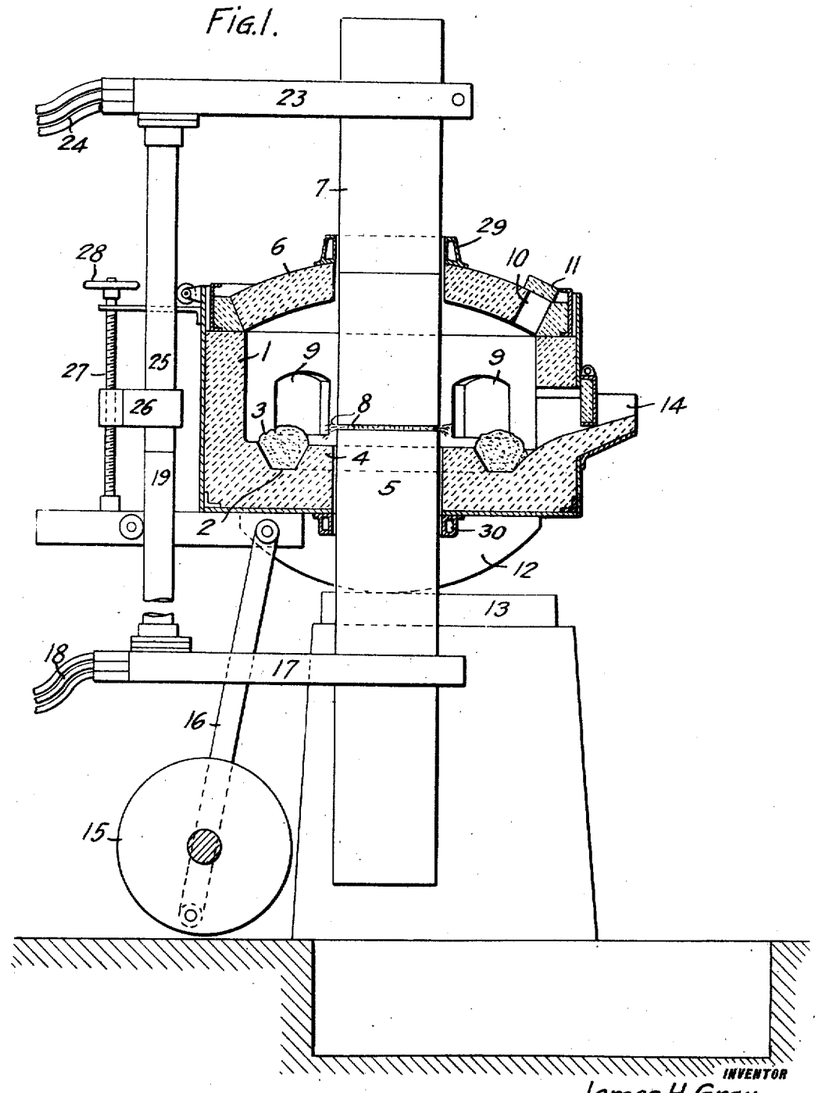
Figs. 1 and 2 are respectively a vertical section and plan of a single electrode furnace.
Figure 2:
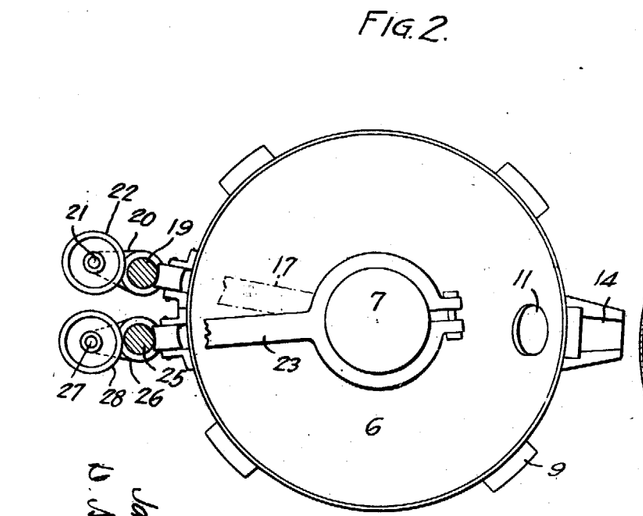

Referring first to Figs. 1 and 2, the circular furnace has an annular trough-shaped hearth which carries the charge 3 and a central elevated portion 4 through which passes up a lower electrode 5. The furnace is closed at the top by a roof 6 through which passes an upper electrode 7 to strike the arc 8 with the lower electrode. The furnace is constructed with the usual shell lined with suitable refractory material and has side charging doors 9 and an upper charging opening 10 through the roof ordinarily closed by a cover 11. The furnace is mounted on rockers 12 rolling on tracks 13 so that it may be tilted to pour out the molten charge through a spout 14 into a ladle or other receptacle.

The mechanism for tilting the furnace and adjusting the electrodes is indicated diagrammatically, any usual or suitable mechanism being useable for this purpose.

For tilting the furnace I have indicated a rotary mechanism 15 operating on a crank pin connected to a link 16 which is connected to the rear of the rockers 12.

The lower electrode 5 is carried in a clamping arm 17 which connects it electrically with the cables or leads 18 and which is supported by the post 19 (Fig. 2) to which is fastened a bracket 20 the outer end of which is in the form of a nut engaging a worm shaft 21 operated by a hand wheel 22 on its upper end; the shaft 21 being fixed at its upper and lower ends in brackets fastened to the furnace so as to tilt therewith.

Similarly the upper electrode 7 is held by a clamp 23 connecting with the cables 24 and supported on the upper end by a post 25, near the lower end of which is mounted a bracket 26 engaging a worm shaft 27 turned by a hand wheel 28.

The use of the arc avoids any disarrangement of the heating medium when the furnace is tilted and similarly avoids any contamination of the charge by carbon. I prefer to use electrodes of much greater area than is required to carry the necessary current, and I prefer also to apply the power at a low voltage with a short electric arc. Thus the electrodes present very large surfaces to each other which are very close together, and the heat generated by the arc must escape in a horizontal direction from the spaces between the electrodes, thus throwing the heat over the charge and preventing its being radiated directly up against the roof (which would tend to a rapid destruction of the latter).

For example, I may make the electrodes of 24 inches in diameter and the charge (and the quantity of current required to melt it) relatively small compared with the carrying capacity of the electrodes, say 1500 pounds of charge. The current furnished in the given case may be between 25 and 50 volts. The low voltage, say 30 volts gives an arc whose length is about ¼ or ⅜ of an inch. The electric power to be applied in melting the charge of 1500 pounds of brass in a reasonable time would not exceed 100 kilowatts which, with a direct current or a single phase alternating current at 30 volts would have a current value of about 3400 amperes. A 24 inch electrode of carbon can carry 15,000 amperes, and if of graphite can carry 50,000 amperes. The electrode, therefore, will be very much underloaded. The wear by the arc will be very slow, requiring very little adjustment of either electrode except that necessary to regulate the current. There is always a slight irregularity in the faces of the electrodes, and the arc will be struck at the point where the distance between them is shortest. As this point of the electrodes wears away the arc will shift to the new shortest path and will thus travel to all portions of the electrode faces, wearing them away gradually and evenly. The arc, being of comparatively small intensity, covers only a small part of the electrode faces at a given moment.

In some cases it may be desirable to apply an excessive amount of current or voltage or both for preheating the furnace before introducing the charge, or for a time after the introduction of the charge. With the large electrodes this excess of heat is available at any time that it may be desired. When the charge is molten and is at the desired temperature the current may be cut off before pouring. The furnace may also be used continuously, withdrawing only a portion of the molten charge at a time and refilling the furnace leaving a reservoir of metal always in the furnace. A slag covering for the charge may be employed or not according to circumstances.

The electrodes are surrounded by water cooled collars 29 and 30 where they pass through the top and bottom of the furnace. Gases from the furnace are condensed against the cold surfaces of the collars and thus form a seal to maintain the furnace practically air-tight. This fact, with the generation of carbon monoxide gas from the electrodes, maintains the conditions within the furnace non-oxidizing; that is, neutral or reducing. The furnace is thus adapted to work on metals which when heated by flames are always more or less oxidized.

In the furnace described, as well as those hereinafter referred to, various features are shown which are not essential to the invention. The furnace may be stationary and emptied through a tap hole, in which case the electrode-operating mechanism need not be attached to the furnace. Also this mechanism may be operated by hand or by an automatic regulator; or one electrode by hand and the other automatically. The various switches, volt changers and other instruments for controlling the power input may be of any usual or suitable design. A higher voltage than that above described and a correspondingly longer arc may be used. Although a vertical arrangement of the electrodes is preferable it is possible to have the upper electrode or the lower electrode or both of them enter the furnace horizontally or obliquely.

Figure 3:
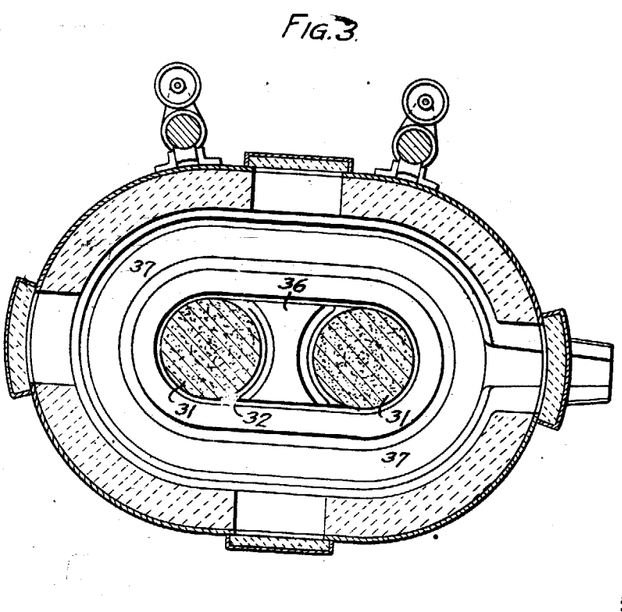
Figs. 3 and 4 are respectively a horizontal and a vertical section of a two-electrode furnace.
Figure 4:
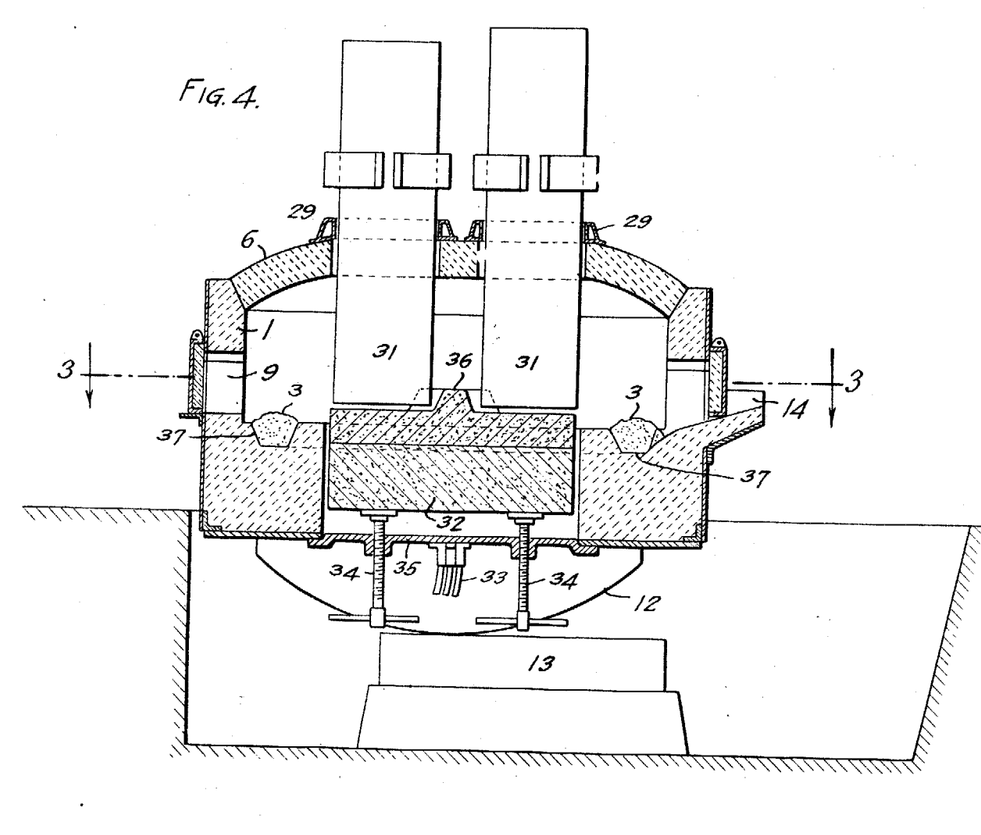

In Figs. 3 and 4 there are two upper electrodes 31 and a single lower electrode 32. This furnace may use direct current or single-phase alternating current or two-phase alternating current. In the last case the current may be obtained by means of the Scott-connected transformer. For direct current or single-phase current the two upper electrodes are in series with each other through the lower electrode. For two-phase current the upper electrodes 31 are in parallel and a bottom connection 33 is made to the lower electrode, the connection passing through jackscrews 34 which are used to adjust the elevation of the lower electrode, and the bottom plate 35. This plate is removable to permit the introduction of a new electrode 32 when it wears away.

In this arrangement the electrodes 31 will wear the surface of the lower electrode immediately under the ends of the upper electrodes, thus leaving the projection 36 between the two upper electrodes which is very refractory and assists in reflecting the heat under the electrode 31 and toward the charge 3 in the surrounding trough 37.

Figure 5:
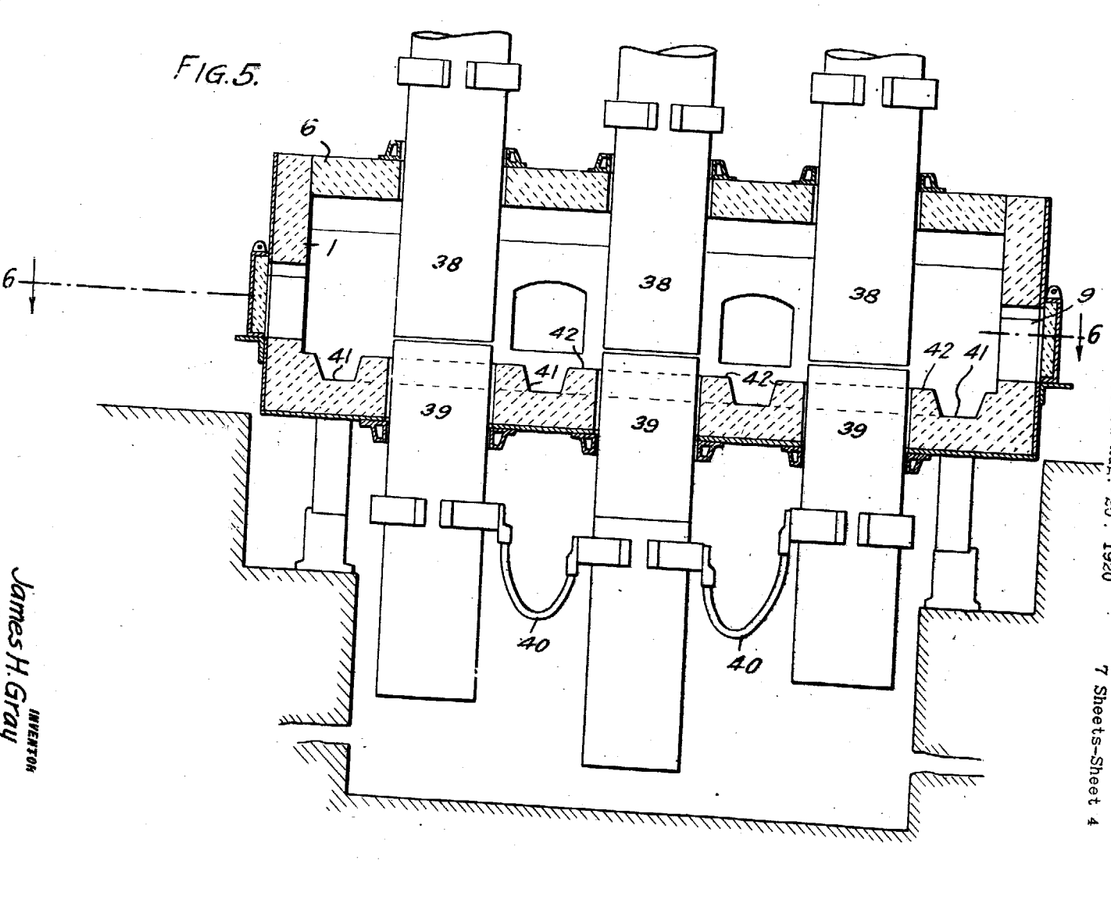
Figs. 5 and 6 are respectively a vertical and a horizontal section of a three-electrode furnace.
Figure 6:
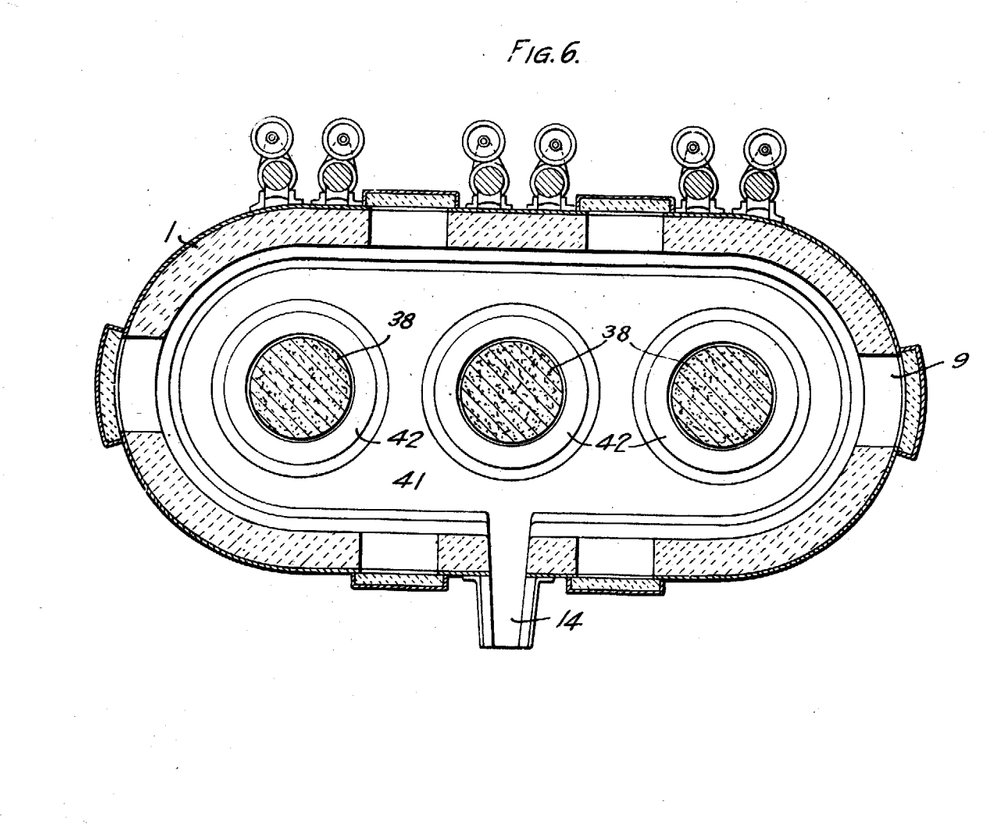

Referring to Figs. 5 and 6, there are 3 upper electrodes 38 in line with each other and three similarly located lower electrodes 39.

In this furnace the bottom electrodes are united by means of electrical connections 40, and form the neutral of the three-phase current. The trough 41 surrounds the electrodes being separated from each other by a high portion 42 of the furnace bottom, constituting a sort of island in the trough. A single electrode in horizontal position, like the electrode 32 in Figs. 3 and 4, might be arranged to underlie the three upper electrodes 38 and form a neutral connection therefor, instead of the separate bottom electrodes 39 with their electrical connection to one another.

Figure 7:
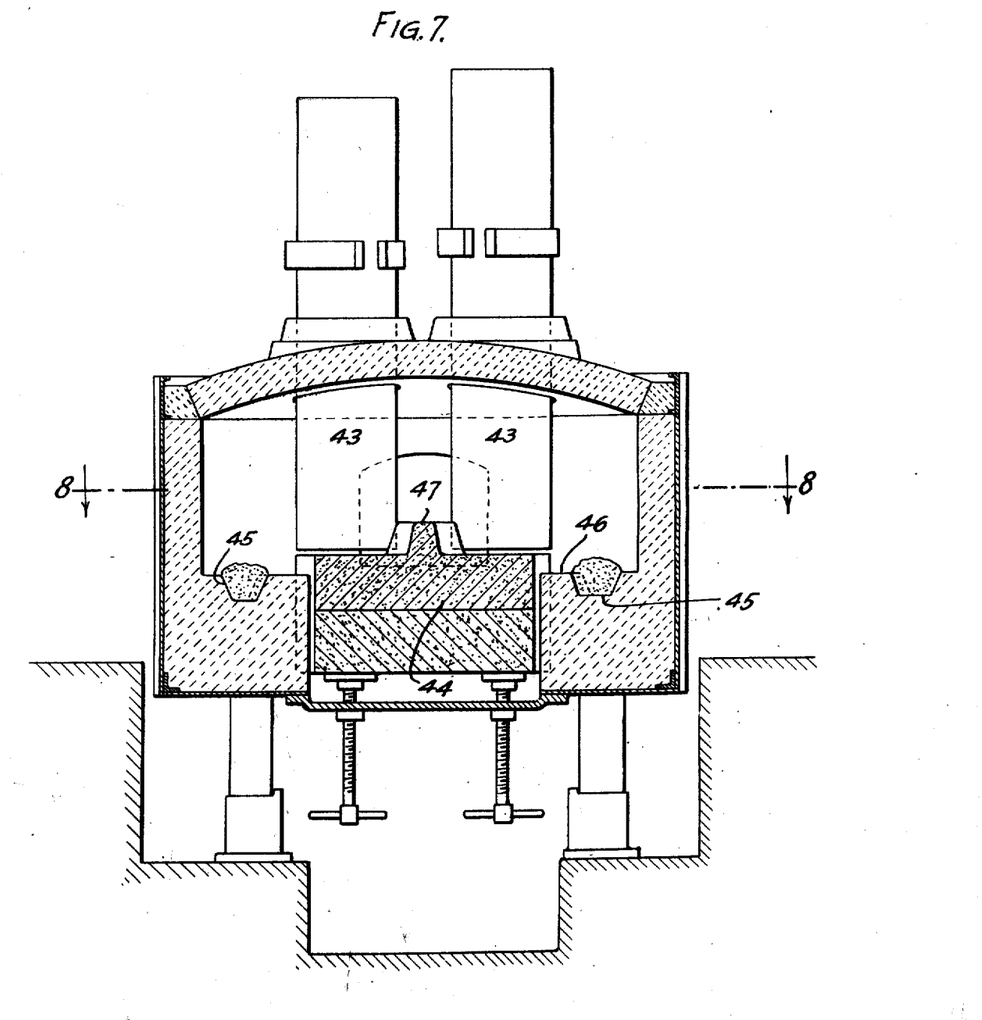
Figs. 7 and 8 are respectively a vertical and a horizontal section of another style of three-electrode furnace.
Figure 8:
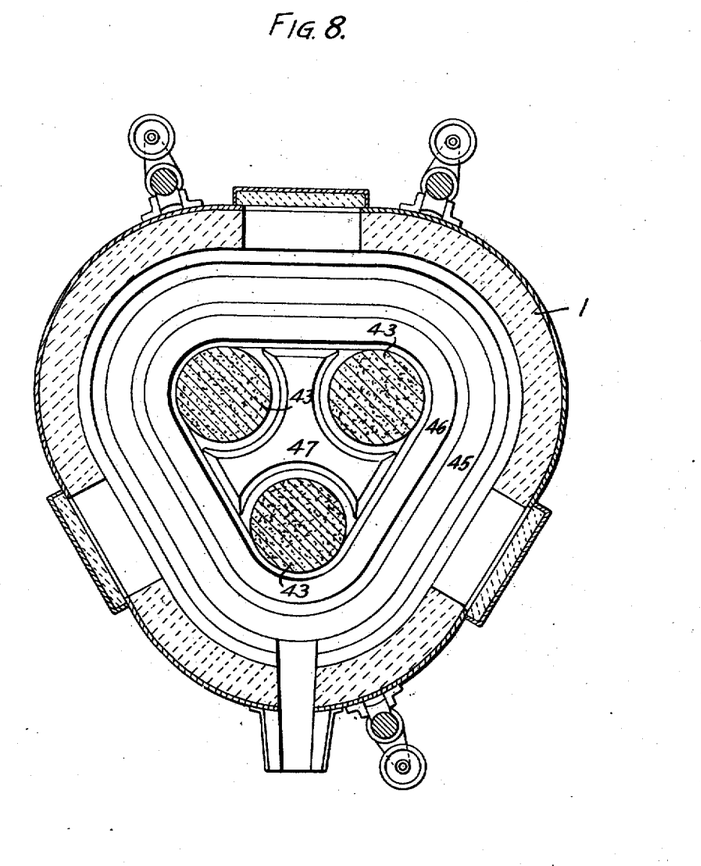

Referring to Figs. 7 and 8, there is a three-phase furnace in which the upper electrodes 43 are arranged at the apexes of an equilateral triangle, which is a favorable disposition for a three-phase current. The single lower electrode 44 of triangular shape has its corners lying under the upper electrodes and forms a neutral connection for the latter. The trough 45 extends around the central triangular elevation 46 which surrounds all three of the lower electrodes. Or it might be extended around each of the electrodes individually as in Fig. 6.

I have used the word "annular" to define such a hearth extending around the electrodes as well as to include the hearths shown in the other drawings, since in all these cases the functional aspect is the same.

The wearing away of the corners of the bottom electrode produces a projection 47 in the center thereof similar to the projection 36 in Fig. 4 and operating to throw the heat laterally over the charge.

Besides the arrangements and positions of electrodes illustrated in the several figures above described, various other arrangements may be used; a variety of such is illustrated, for example, in my Patent No. 1,113,778 of October 13th, 1914.

The adjustability of the lower electrode as well as the upper one makes it possible to adjust the level of the arc, and under some circumstances such an adjustment is advantageous. For example, at the beginning of the operation the solid charge of scrap or the like may extend a certain distance above the walls of the trough-shaped hearth. In the case of high volatile metals the arc should be adjusted at this time to a level somewhat above the top of the charge so that the heat will not play directly on the latter with its greatest intensity. When the charge has practically or wholly liquefied and has settled below the walls of the hearth, the arc may be lowered to a point just above such walls, so as to be as far away as possible from the roof of the furnace.

Though I have described with great particularity of detail certain specific apparatus and methods embodying my invention yet it will be understood that modifications may be made therein by those skilled in the art without departing from the invention as defined in the following claims:

1. A furnace for low volatile charges comprising electrodes having their opposed faces very much larger than the arc and very close together so as to cause the heat of the arc to escape transversely from the space between them, and an annular hearth for the charge located around the electrodes, said furnace being practically closed against the admission of air.

2. A furnace for low volatile charges, comprising an electric heating device and an annular hearth for the charge located around the outside of said heating device, said furnace being arranged to tilt in order to pour out its molten contents.

3. A furnace for low volatile charges, comprising an electric arc heating device and an annular hearth for the charge located around the outside of said heating device, said furnace being adapted to tilt to pour out the molten charge.

4. A furnace for low volatile charges, comprising electrodes arranged to strike an arc between them, and a hearth for the charge, the cross section of the electrodes in proportion to the size of the hearth being very much greater than necessary to carry the current required to melt the charge on the hearth.

5. A furnace for low volatile charges, comprising electrodes for forming an arc and a hearth for the charge, said electrodes having their opposed faces very much larger than the arc, and very close together, so as to cause the heat of the arc to escape transversely from the space between them.

6. A furnace for low volatile charges, comprising an annular hearth a pair of electrodes adapted to form an arc, the heat of which is directed horizontally toward or over the charge in said hearth and means for adjusting the level along which the heat of the arc is directed.

7. A furnace for low volatile charges, comprising an annular hearth a pair of vertical electrodes adapted to form an arc, the heat from which is directed horizontally toward or over the charge on said hearth and means for adjusting said electrodes to regulate the level of the arc.

8. A furnace for low volatile charges, comprising electrodes arranged to form a plurality of arcs an annular hearth adapted to support the charge in one mass, said electrodes having their opposed faces very much larger than the arc and being very close together so as to cause the heat of the arc to escape transversely between them.

9. A furnace for low volatile charges, comprising a hearth arranged to hold a molten metal bath and a heating means including an electrode extending through the bottom of the furnace and movable therethrough.

10. A furnace for low volatile charges, comprising a hearth for molten metal and a heating means including an electrode extending through the bottom of the furnace and an upper electrode arranged to strike an arc directly with said lower electrode.

11. The method of heating low volatile metals which consists in providing an arc between opposed electrodes having faces very close together so as to cause the heat of the arc to escape transversely from the space between them and arranging the charge in one mass on a hearth surrounding the arc.

12. The method of heating low volatile metals which consists in providing an electric arc, arranging the charge on a hearth at the side of the arc and adjusting the level of the arc as the level of the charge changes.

In witness whereof, I have hereunto signed my name.

JAMES H. GRAY.